Figure 1:
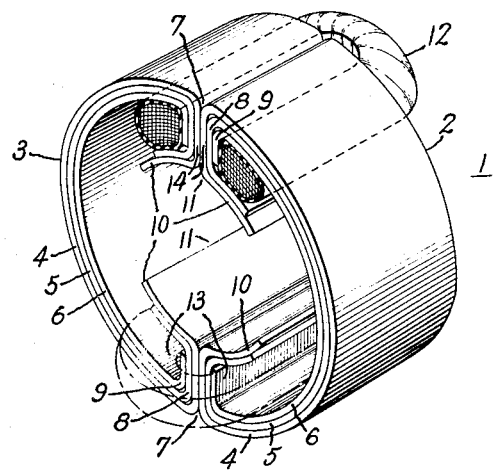

Oct. 2, 1956     K. M. FEIERTAG     2,764,802

METHOD OF ASSEMBLING A FIELD COIL ON A STATOR

Filed July 17, 1953

Inventor:
Karl M. Feiertag,
by *Robert G. [signature]*
His Attorney.

United States Patent Office 2,764,802
Patented Oct. 2, 1956

2,764,802

METHOD OF ASSEMBLING A FIELD COIL ON A STATOR

Karl M. Feiertag, Fort Wayne, Ind., assignor to General Electric Company, a corporation of New York Application July 17, 1953, Serial No. 368,803

2 Claims. (Cl. 29—155.58)

This invention relates to dynamoelectric machines and more particularly to an improved stator construction for salient pole machines and its method of manufacture.

In many applications of salient pole dynamoelectric machines, such as small series motors, it is of the utmost importance that the manufacture of such machines be achieved simply and economically. It is further necessary that these objectives be obtained without sacrificing in any way the efficiency of the motor.

There are at present several means of manufacturing stators for salient pole machines. One of these methods is the stacking of suitably shaped laminations; another is the manufacture of a cylindrical ring of relatively heavy cross-section with the salient pole pieces bolted to its inner periphery. While the first of these two provides a magnetically correct structure, it involves considerable waste of material in the forming of the laminations. The cylindrical ring method is somewhat more economical to manufacture, but presents the disadvantage that it has gaps which interfere with the magnetic flux paths. The cylindrical ring structure further has the disadvantage of a rather high armature reaction flux because of the solid salient pole construction.

My improvement eliminates waste of material since it utilizes groups of purely rectangular metal sheets. It is extremely easy to assemble and in its finished form presents a magnetically correct structure in which the formed metal substantially coincides with the flux lines and wherein a gap is automatically furnished in the center of each pole to assist in the reduction of armature reaction flux.

An object of this invention is therefore to provide a construction which eliminates waste of magnetic material in salient pole stators for dynamoelectric machines.

Another object of this invention is to provide a structurally correct stator for a salient pole dynamoelectric machine while substantially increasing the ease of assembly.

A further object of this invention is to provide an improved method of making a stator for a salient pole dynamoelectric machine.

Further objects and advantages of this invention will become apparent and the invention will be better understood by reference to the following description and the accompanying drawing; the features of novelty which characterize this invention will be pointed out with particularity in the claims annexed to and forming a part of this specification.

This invention in its broadest aspects provides a stator member for a salient pole dynamoelectric machine comprising at least two sections, each section being formed as a longitudinal radial section of a hollow cylinder and having two ends meet inwardly into a channel. The sections are secured together to form a cylinder with the inwardly bent ends cooperating to form stator poles. The complete stator member may be assembled in accordance with this invention by first assembling the sections, positioning field coils over the inwardly bent ends, and then bending the ends to form the channel sections.

Figure 2:
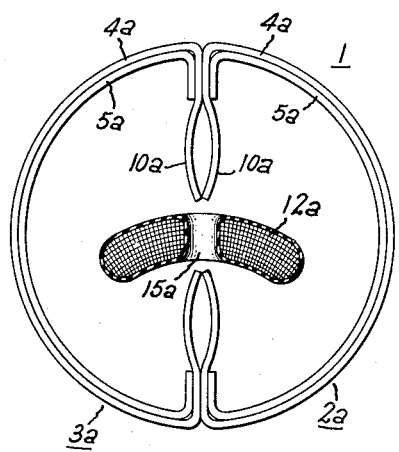
Figure 3:
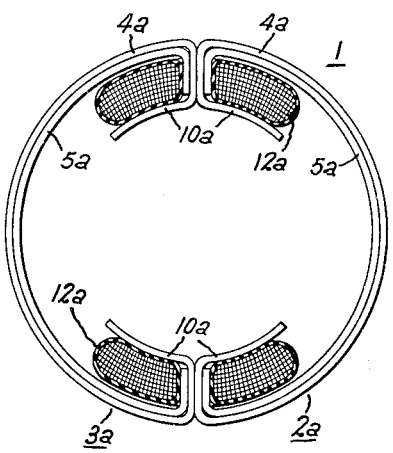

In the drawing Fig. 1 is a view in perspective, partly in cross-section, of the improved stator of this invention;

Fig. 2 is an end view, partly in cross section, of the stator of this invention in the course of an improved method of assembly; and Fig. 3 is an end view, partly in cross-section, of a finished stator assembled by the method shown in Fig. 2.

Referring now to Fig. 1 of the drawing, there is shown a salient pole dynamoelectric machine stator generally indicated at 1. Stator 1 is made up of two sections 2 and 3, each formed as a longitudinal radial section of a cylinder; each of these sections 2 and 3 consists of three laminar segments; an outer segment 4, an intermediate segment 5, and inner segment 6. The circumferentially displaced ends of segment 4 are bent into channels as shown at 7. Segments 5 also have their ends bent into channels as at 8. Inner segments 6 merely have their circumferentially displaced ends 9 bent over as shown. Segments 4, 5, and 6 preferably are formed of sheet magnetic steel and are proportioned so as to be substantially concentric and nest snugly within each other, preferably with a slight interference fit. After the segments have been fitted together, the two assemblies 2 and 3 are then brought together and held in assembled relation in any suitable manner, as by welding, preferably along the lines where segments 4 come together. When the sections 2 and 3 have been connected together, inner flange portions 10 of segments 4 cooperate to form stator poles 11. Field coils (one being shown at 12) are then respectively positioned on poles 12 occupying the spaces 13 formed by the bent ends of the segments 4, 5, and 6.

It is to be understood that the use of a triple layer of segments is merely an illustrative embodiment and that any number of segments desired may be used. The structure described above will automatically furnish a laminated pole shank structure because of abutting channel bights 14. The discontinuity of magnetic material at this point has the effect of materially reducing armature reaction flux.

Figs. 2 and 3 show an improved method of assembling the stator of this invention. The stator shown in these two figures is shown as having only two segments 4a and 5a for each of the assemblies 2 and 3. However, as with respect to the description of the stator of Fig. 1, the number of segments may be varied as desired. Instead of bending the ends of assemblies 2a and 3a into channel shapes before connecting them together, pole portions 10a are given the desired curvature but are left pointing inwardly towards the center of the stator. A coil 12a is provided which is a conventional rectangular coil in all respects except insofar as hole 15a is concerned. Since assembling of coil 12a merely involves slipping it over pole portions 10a, hole 15a may be smaller than is generally required, thereby reducing the span of coil 12a and effecting a considerable reduction in the amount of wire required for coil 12a. After coil 12a has been slipped over pole pieces 10a to the position shown in Fig. 3, where it is abutting the inner periphery of segments 5a, pole portions 10a are bent back into place as shown, and the assembly is complete.

It is apparent from the above explanation that because of the way in which the segments are formed the flow lines of the flux will follow the bends of the segments and that there will not be, therefore, any undesirable gaps. It will also be seen that my improvement furnishes a simple, economical method of assembling salient pole dynamoelectric machine stators and eliminates the wasting of material.

While the invention has been explained by describing particular embodiments thereof, it will be apparent that improvements and modifications may be made without departing from the scope of the invention as defined in the appended claims.

What I claim as new and desire to secure by Letters Patent of the United States is:

1. An improved method for assembling a field coil on a stator of a salient pole dynamoelectric machine, said stator comprising at least two sections secured together to form a cylinder, each of said sections being formed as a longitudinal radial section of a hollow cylinder and being bent inwardly at each end, each end of each of said sections extending substantially parallel and adjacent to an end of one of said other sections to which said first mentioned section is secured, said method comprising the steps of forming the extremity of each inwardly bent end into an arc convex to the section of which it is a part, sliding said coil over two adjacent formed extremities to a position abutting the inner periphery of each of two of said sections secured together, and bending said formed extremities to a position wherein each of said extremities is parallel to the section of which it is a part whereby said adjacent extremities form the two halves of a stator pole and maintain said coil in said position.

2. An improved method for assembling a field coil on a stator of a salient pole dynamoelectric machine, said stator comprising at least two sections secured together to form a cylinder, each of said sections being formed as a longitudinal radial section of a hollow cylinder and comprising a plurality of nested laminar segments, at least the outermost segment of each of said sections being bent inwardly at each end, each end of each of said outer segments extending substantially parallel and adjacent to an end of another of said outer segments, said method comprising the steps of forming a portion of each inwardly bent end remote from the periphery of the cylinder into an arc convex to the segment of which it is a part, said arc having a smaller radius than said segment, sliding said coil over two adjacent formed portions to a position abutting the inner periphery of each of two of said sections secured together, and bending each of said formed portions back toward the segment of which it is a part to a position wherein said portion is parallel to said segment whereby said adjacent portions form the two halves of a stator pole and firmly maintain said coil in its abutting position.

References Cited in the file of this patent

UNITED STATES PATENTS

| | | |
|---|---|---|
| 1,042,946 | Mittinger | Oct. 29, 1912 |
| 1,255,606 | Hensley | Feb. 5, 1918 |
| 1,314,132 | Dorsey | Aug. 26, 1919 |
| 1,501,372 | Robinson | July 15, 1924 |
| 1,569,218 | Dake | Jan. 12, 1926 |
| 1,837,451 | Lee | Dec. 22, 1931 |
| 1,990,678 | Vaucher | Feb. 12, 1935 |

FOREIGN PATENTS

| | | |
|---|---|---|
| 885,788 | France | June 7, 1943 |
| 231,570 | Switzerland | June 16, 1944 |